United States Patent
Fossum et al.

(10) Patent No.: US 6,222,172 B1
(45) Date of Patent: Apr. 24, 2001

(54) PULSE-CONTROLLED LIGHT EMITTING DIODE SOURCE

(75) Inventors: Eric R. Fossum, La Crescenta; Gregory Waligorski, Arcadia, both of CA (US)

(73) Assignee: Photobit Corporation, Pasadena, CA (US)

( * ) Notice: Subject to any disclaimer, the term of this patent is extended or adjusted under 35 U.S.C. 154(b) by 0 days.

(21) Appl. No.: 09/246,013

(22) Filed: Feb. 4, 1999

Related U.S. Application Data

(60) Provisional application No. 60/073,606, filed on Feb. 4, 1998.

(51) Int. Cl.[7] .................. G01J 5/30; G01J 5/60
(52) U.S. Cl. .................. 250/205; 250/228; 356/236
(58) Field of Search .................. 250/205, 216, 250/228; 356/30, 236, 243.5

(56) References Cited

U.S. PATENT DOCUMENTS

| | | | |
|---|---|---|---|
| 4,232,971 | * | 11/1980 | Suga ..................... 250/228 |
| 4,720,190 | * | 1/1988 | Peterson .................. 356/236 |

\* cited by examiner

*Primary Examiner*—Stephone B. Allen
(74) *Attorney, Agent, or Firm*—Fish & Richardson P.C.

(57) ABSTRACT

A light-emitting diode array is driven by a digital control. The digital control modulates the pulse width of pulses applied to the light-emitting diode. The intensity of the output is controlled by controlling the width of pulses applied to the light-emitting diode. Since light-emitting diodes have very low inertial energy, this system can be rapidly turned on and turned off. The output is integrated to produce a uniform output.

12 Claims, 4 Drawing Sheets

PULSE-CONTROLLED LIGHT EMITTING DIODE SOURCE

CROSS REFERENCES TO RELATED APPLICATIONS

This application claims the benefit of the U.S. Provisional Application Ser. No. 60/073,606, filed on Feb. 4, 1998, which is incorporated herein by reference.

BACKGROUND

Many different image sensors are known in the art. In most cases, the basic function of an image sensor is to produce an electrical response indicative of the intensity of light illuminating its picture elements, or pixels. Each individual pixel contains a light detector, which produces an electrical signal by converting the photons of the incident light to electrons, and accumulating these electrons for a certain period of time. This period of accumulation is often called the integration time, because the process of accumulating light-generated electrons, or photoelectrons, is equivalent to integrating the light intensity over time. Typically, the pixel is exposed to light for its entire integration time, in which case the exposure time and integration time are identical. It is possible, however, to make the exposure time shorter than the integration time by turning off or blocking the light for some part of the integration time.

Generally, the number of photoelectrons collected in the pixel depends on the length of the exposure time and on the intensity of the incident light during that time. A change in one quantity is typically indistinguishable in its effect from a change in the other—both change the amount of light absorbed by the pixel, the number of photoelectrons that are generated, and consequently the electrical response of the pixel. In the particular case when the light intensity is constant throughout the exposure time, the pixel response is simply proportional to both the light intensity and the length of the exposure.

Complete testing of an image sensor requires measuring its various physical characteristics, including the response to different amounts of light. Determination of the dynamic range of the sensor requires varying the amount of light over a comparable, or wider, dynamic range. In most cases, it is difficult to do so by varying the light intensity while keeping the exposure time constant. Light sources typically work well only within a narrow range of output intensities, or change their spectral characteristics when their output intensity is changed. Moreover, the variation of their output intensity within the available dynamic range is typically nonlinear. An alternative to changing the light source output is to use an external light intensity attenuator. The throughput of such a device usually cannot be continuously and precisely varied. In contrast, it is relatively easy to control the exposure time of the sensor with high precision. As stated above, changing the duration of the sensor's exposure to a constant light level causes a proportional change in its response. Hence, varying the exposure time instead of the light intensity has often been the preferred method of measuring such sensor parameters as dynamic range, linearity, signal-to-noise ratio, and conversion gain.

Traditional incandescent light sources have large thermal inertia. This slows their response to power supply interruptions. Therefore, it is difficult to effectively vary the time of the sensor's exposure to light from such a source by interrupting the operation of the source. Typically, a more accurate exposure control is achieved by fast shuttering of the continuously emitted light.

SUMMARY

The present specification describes a light source which does not have these drawbacks. This light source uses light emitting diodes with controllable output parameters. Light-emitting diodes are orders of magnitude faster in their response to voltage-supply interruptions than incandescent light sources. Typically, a light-emitting diode has a rise-and-fall time below 1 microsecond. This makes it possible to precisely control the sensor's exposure time.

According to a preferred mode, an LED array is powered with a periodic rectangular voltage waveform whose duty cycle is digitally controlled. A system is described herein which allows achieving a three-decade dynamic range of exposure time for integration times below a thirtieth of a second.

BRIEF DESCRIPTION OF THE DRAWINGS

These and other aspects of the invention will be described in detail with respect to the accompanying drawings, wherein.

DESCRIPTION OF THE PREFERRED EMBODIMENTS

Figure 1:
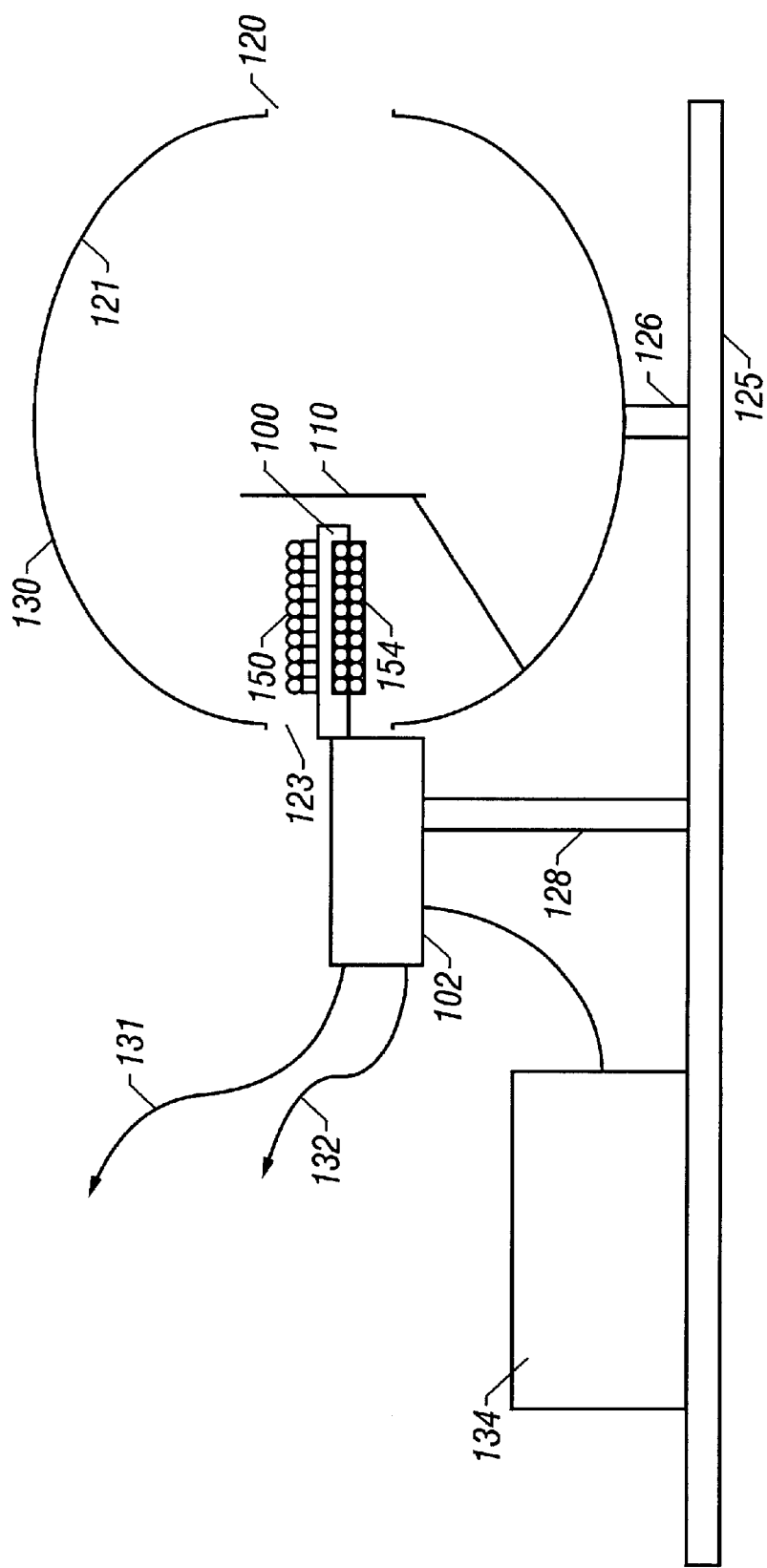
FIG. 1 shows a schematic diagram of the light source used according to the present mode.

The light emitting array uses a light source that has a very small thermal inertia, and hence permits a very fast response time, e.g, less than 10 $\mu$s, and more preferably on the order of 100 ns. That is, the light emitting array uses a source that is capable of initiating and terminating a light burst within 100 ns of the appropriate change in the voltage applied to the source. The preferred mode uses a LED array 100 that has the general layout shown in FIG. 1. Specifically, the LED array includes four different types of LEDs, each type emitting in in a different part of the electromagnetic spectrum.

There are preferably six LEDs 150 which emit infrared radiation. Three groups of eighteen LEDs, 152, 154, and 156, emit respectively in the red, green, and blue regions of the visible spectrum. The combination of three primary colors, red, green, and blue, is preferred, but more generally, other LEDs emitting light of other colors could be used instead. The LEDs are driven by a LED driver 102 which is described in further detail herein.

The LED array is a bar-shaped part with the LEDs mounted in six parallel rows in such a way that they emit light in three directions perpendicular to the axis of the bar. If the axis is aligned horizontally as in FIG. 1, the two rows of LEDs on top of the bar emit vertically upward, while the LEDs in the pairs of rows on the left and right side of the bar emit in the directions that are 120 degrees with respect to the vertical and to each other. Each row of LEDs contains a single infrared LED and three LEDs of each primary color, giving a total of ten LEDS per row. In each row, the nine red, green, and blue LEDs are arranged in the sequence, RGBRGBRGB, to provide improved color mixing.

The LED array is fully inserted into an integrating sphere 130 through its 1" diameter input port 123. The integrating sphere 130 is a hollow sphere of cast aluminum with a layer of white reflecting material on its interior surface. This is a high reflectivity material, which however does not reflect light specularly, but instead diffuses it in all directions. The integrating sphere is preferably 8" in diameter. These integrating spheres are commercially available.

Integrating sphere 130 integrates the light output from the LED array and acts as an efficient light diffuser. That is, the light from all of the LEDs is mixed by multiple reflection and diffusion within the integrating sphere 130. By the time the light reaches the output port 120, it is effectively uniform in color and intensity. This uniform light output can be used to illuminate the entire pixel arrays of image sensors, with spatial nonuniformity less than 1% across a 2×2 cm array.

The integrating sphere is held on a base plate 125 by a supporting post 126. In the preferred mode, the same base plate 125 also holds the LED driver 102 via another post 128. The LED array 100 in this embodiment is physically attached to and supported by the LED driver 102, although it can be spaced therefrom.

A circular-shaped light baffle 110 separates the LED array 100 from the output port 120. The baffle blocks all direct beam paths from the LEDs to the output port, so that light emitted by the LEDs can reach the output port only by multiple reflection from the inner surface of the integrating sphere. The light baffle is held within the integrating sphere by supports 109. This light baffle is a standard part of commercially available 8" integrating spheres.

The LED driver is controlled by a personal computer via a five-line connection 132. The LED driver also has a connector 131 for an optional gating signal. The power for the LED driver and LED array is provided by a commercially available 5V DC power supply. 134. The preferred embodiment of the LED array has all LEDs connected in parallel so that the maximum voltage across each LED can be as high as 5V. However, each type of LED used therein has a different optimal working voltage, varying from about 1.8 V for red LEDs to about 3.6 V for blue LEDs. The LED driver 102 converts 5V control signals received from the PC to these optimal voltages, supplying to each LED the optimal working current of about 20 mA. Each drive to each LED, however, is either on or off, and is hence digital in the sense that it is either on or off.

If access to the LED array is required, the entire assembly 100/102 can be detached from the post 128, and removed from the integrating sphere.

The personal computer 200 controls the amount of light emitted by each LED by controlling the duty cycle of the rectangular voltage waveform driving the LED rather than by controlling the voltage driving the LED. The voltages driving the LEDs are switched between high and low levels, alternately turning the LEDs ON and OFF. The duty cycle is the ratio of the light pulse width (the duration of the ON phase) to the full period of the driving waveform (the sum of the ON and OFF phases). Therefore, the LEDs emit more light when their duty cycle approaches one, and less light when the duty cycle approaches zero. In the preferred embodiment the light pulse width is constant and identical for all LEDs. Its preferred value is 1 to 2 us. The duty cycle of each LED is varied by changing the duration of its OFF phase only. The total energy of light emitted during one video frame, i.e. 1/30 of a second, can be linearly varied over a a dynamic range of up to 1,000.

Figure 2:
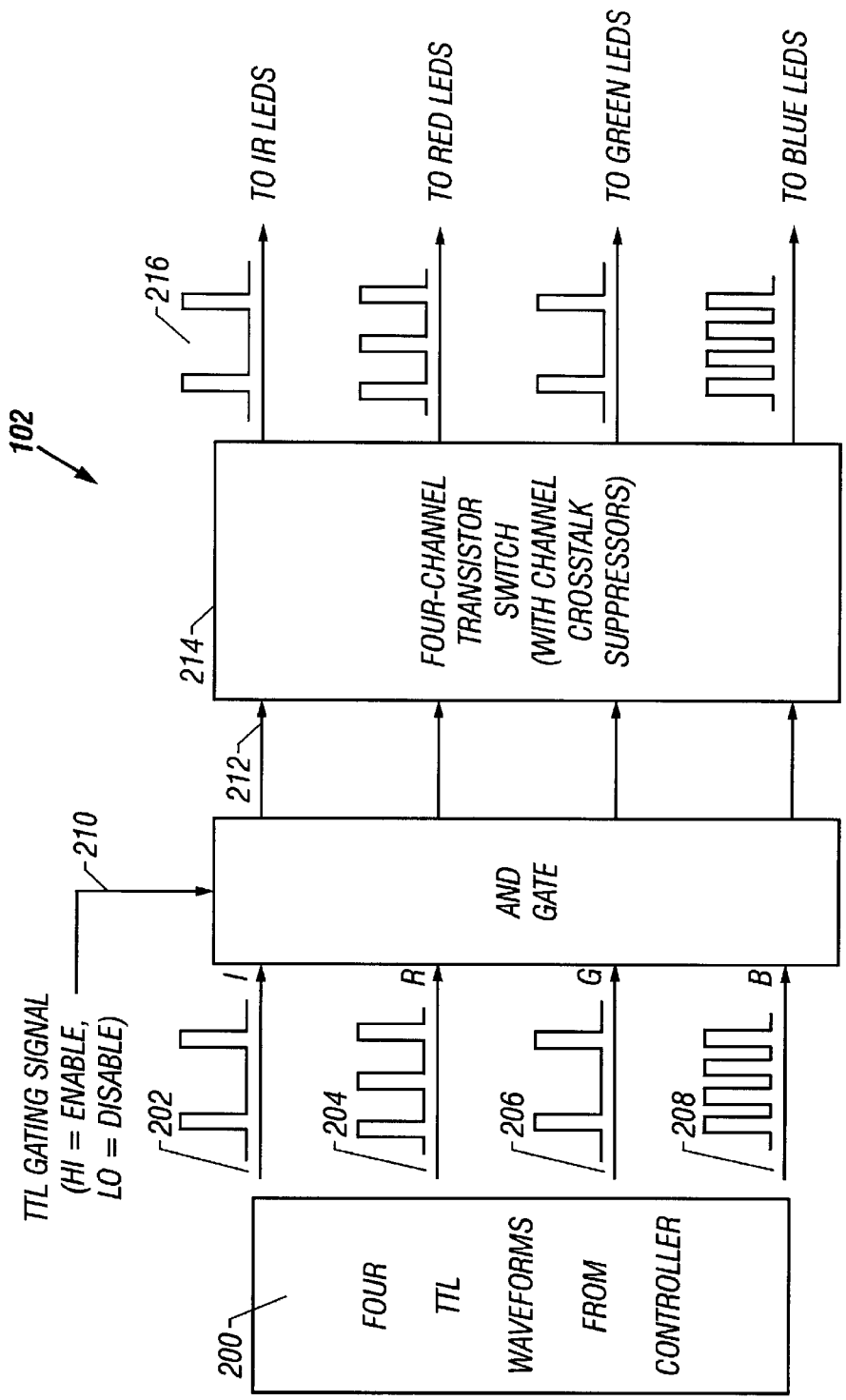
FIG. 2 shows a block diagram of the LED driver.

Even though the controller 200 is shown in FIG. 2 as a personal computer, any device capable of outputting several independent waveforms of appropriate voltage level can be used instead. In the preferred mode each control waveform is a uniform train of rectangular 5V pulses. Other waveforms can also be generated by the controller and applied to the inputs of the LED driver. In FIG. 2, the signal line 202 controls the infrared LEDs, and lines 204, 206, and 208 correspond respectively to red, green, and blue drivers. As shown, the control signal on each line may have a duty cycle different from other signals. The control is digital in a dual sense: first because each control waveform has only two voltage levels and secondly because the duration of the low and high voltage phases is digitally controlled.

As an option, each of the waveforms applied to the control inputs of the LED driver may be gated by an optional TTL signal 210 applied to the input 131. The gating is done by combining each control signal with the gating signal 210 in an AND gate. The control signal is allowed to pass through the gate only when the gating signal 210 is high.

214 represents a set of four transistor switches with some circuitry suppressing cross-talk between the control channels. Each switch is toggled by a TTL control waveform, and in turn toggles a set of same-color LEDs in the LED array, making them operate together as a strobe light. The time-averaged output power of this strobe light, P, is proportional to the duty cycle, Q, of the controlling pulse train. If Q is not allowed to exceed ½, the dynamic range of the energy that can be emitted by the strobe light in time T is equal to T/2t, where t is the light pulse width. The minimum t is determined by the response time of the LEDs, which is on the order of 100 ns. A set of values through which P and Q can be stepped is determined by the smallest time increment allowed by the controller 200. If this time increment is d, the duty cycle can be stepped through a series $Q_n=t/(2t+nd)$, where $n=0, 1, \ldots$. The smallest step that can be made on the Q and P scales is therefore not equal at all points, but varies with Q, approximately as $Q2d/t$.

In the preferred mode the optimal light pulse duration is 1 to 2 ms. These values have been found to give the best P vs. Q linearity for Q £ ½. They also provide sufficient dynamic range of P for testing image sensors at a 30 frames/s acquisition rate. All the control waveforms are generated by a counter-timer board installed in the controller 200. The board is preferably either an AT-MIO-16X or a PC-TIO-10, each commercially available from National Instruments. The smallest time increment for these devices is 200 ns.

Figure 3:
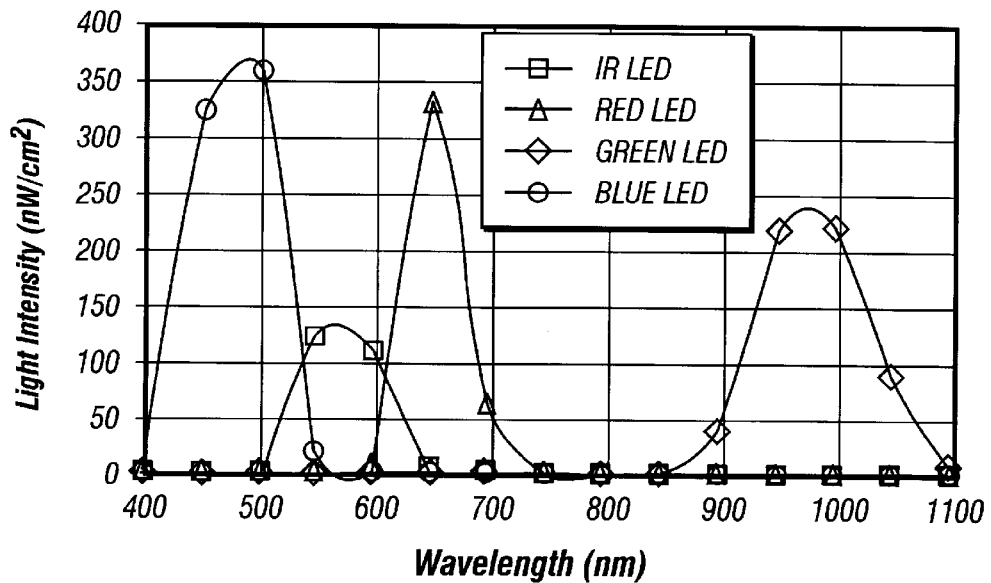
FIGS. 3–5 show results of driving the LED driver using the device described according to the preferred mode.
Figure 4:
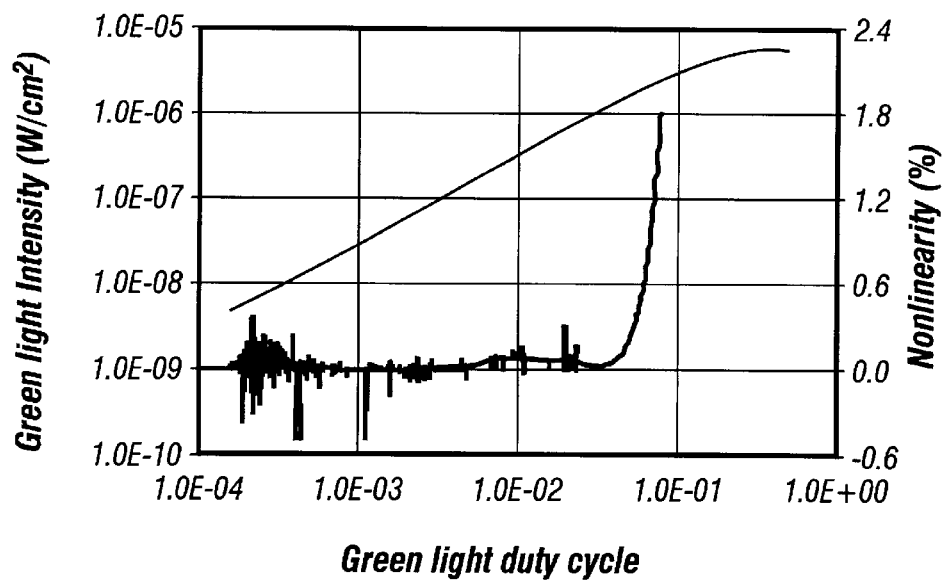
Figure 5:
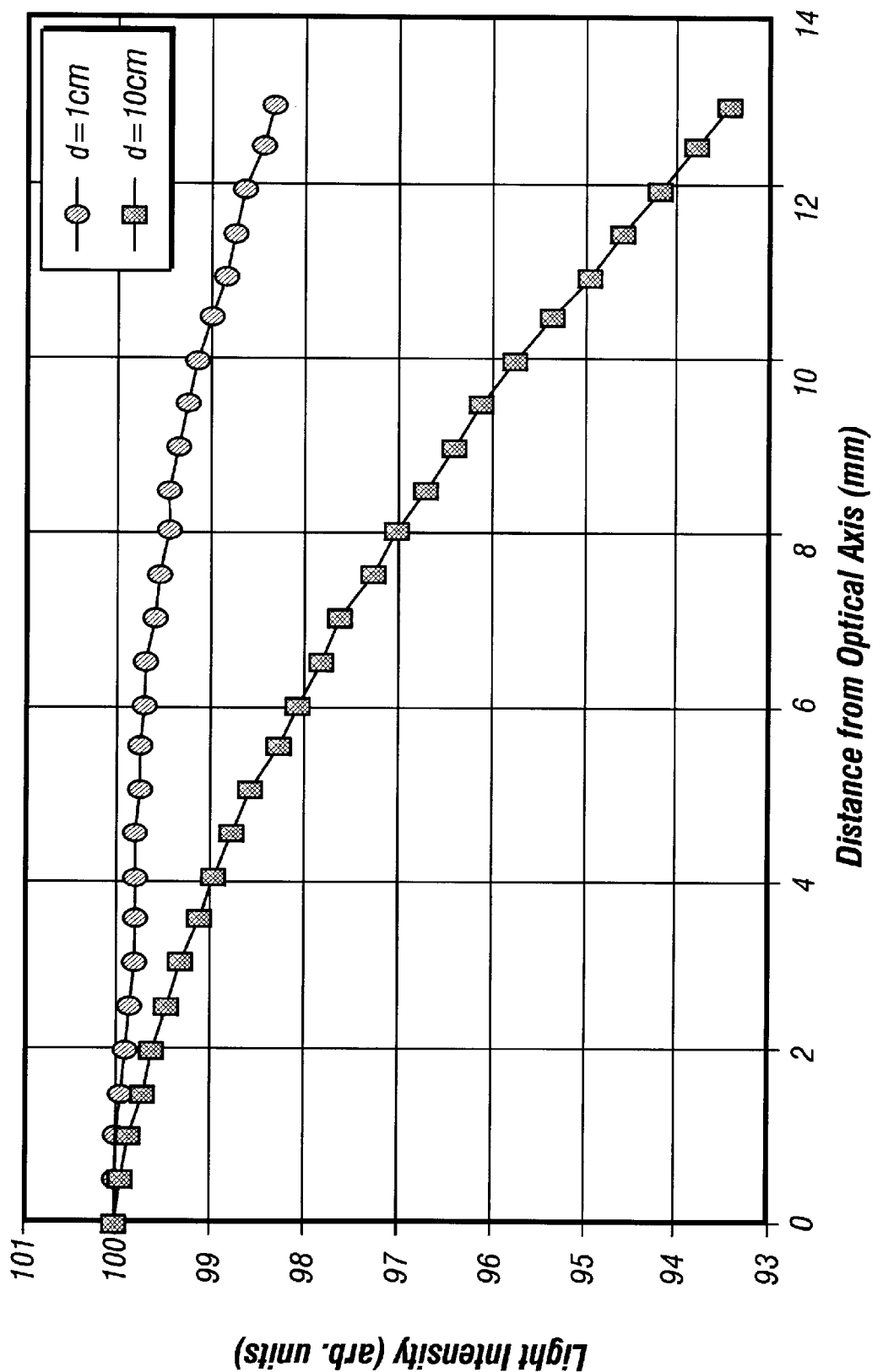

FIGS. 3, 4, and 5 show the essential characteristics of the preferred light source: the emission spectra of the LEDs, the P vs. Q linearity, and the spatial uniformity of the output. The spectral curves in FIG. 3 should be used for general orientation only. These were obtained using a set of narrow-band filters spanning the 400–1100 nm wavelength range in 50 nm steps. These filters have varying bandwidths (10–40 nm) and peak transmittances (50–70%), whose effect on the measured light intensities has not been corrected. The filters were placed between the circular 2" diameter output port of the integrating sphere and a calibrated Melles-Griot 13DSI011 photodiode whose circular 1 cm2 active area was coaxial with the output port. The average power of light incident on the active area was taken as the light intensity to be plotted in FIG. 3.

The duty cycle range of the photodiodes should be determined for each device. The most linearity is obtained if the photodiode is never saturated by the driving.

The time-averaged intensity of light from the green LEDs plotted in FIG. 4 was measured using the same setup, but with no filter between the output port and the photo diode. The distance, d, from the plane of the output port to the surface of the photo diode's active area was equal to 5 mm. The light intensity measured at distances d<15 mm is nearly independent of d. Farther on the axis of the output port (optical axis) the intensity decreases like $1/d^2$.

FIG. 5 shows the uniformity of illumination of two planes perpendicular to the optical axis, at d=1 cm and d=10 cm. The intensity of incident light was averaged over a circular 1-mm-diameter aperture, whose center was at a distance r=0 to 12 mm from the optical axis. Importantly, the LED has three semiconductor dyes in a single package. The light of each color mixes very well with the other colors.

Although only a few embodiments have been described in detail above, other embodiments are contemplated by the inventor and are intended to be encompassed within the following claims. In addition, other modifications are contemplated and are also intended to be covered. For example, other integrating mechanisms besides the integrating sphere described herein can be used. The LED package can also be modified. Preferably, the LEDs are facing away from the output port so that light mixing is optimized. Different colored LEDs can be used, and in fact a single LED could be used.

For example, while an LED has been described as the preferred light source used herein, it should be understood that any light source with very low thermal inertial could alternatively be used. Moreover, other colors besides those specifically described here, and other values for timing, could also alternatively be used. All such modifications are intended to be encompassed within the following claims.

What is claimed is:

1. A controllable light source, comprising:
   a light source with low thermal inertia that has a response time less than 10 µs;
   a controller for said light source, said controller including a device which produces a control signal having variable timing characteristics, said control signal having active portions and inactive portions between the active portions, a total active time of said control signal for a first command for a brighter light output being greater than a total active time for said pulses for a second command for a less bright output, said light source being turned on by said active portions to produce light and being turned off by said inactive portions; and
   a light integrator, which integrates said light produced during said active portions, to thereby equalize a result thereof.

2. A device as in claim 1 wherein said low inertia light source includes a light-emitting diode ("LED").

3. A device as in claim 1 wherein said low inertia light source includes at least three types of light emitting diodes, providing a total of three colored LEDs.

4. A device as in claim 2 wherein the pulses have a nominal on voltage level and a transition between a nominal low voltage level and said nominal on voltage level, a timing between said nominal on voltage level and said nominal off voltage level adjust an amount of light output.

5. A method of controlling a light-emitting diode-based light source, comprising:
   providing at least one light-emitting diode; and
   controlling an amount of time that said light-emitting diode is emitting light, by controlling an amount of on-time of a controlling signal to said light emitting diode relative to an amount of off time of said controlling signal, to control an effective output intensity of said at least one light-emitting diode; and
   integrating the output of said at least one light emitting diode to equalize said output.

6. A method as in claim 5, wherein said integrating comprises reflecting light within a sphere.

7. A controllable light source, comprising:
   at least three light emitting diodes, each having a different characteristic of output light;
   a controller for said light emitting diodes, that produces a pulse-width modulated control pulse, having an on state and an off state;
   a brightness controller, controlling said controller to produce longer on states for higher brightness, and shorter on states for lower brightness; and
   a light integrator, surrounding said light emitting diodes, and which integrates light output from said light emitting diodes, said light integrator having an open portion defining an output port from which said integrated light is output.

8. A source as in claim 7, further comprising a light baffle, which diffuses light, located between said light emitting diodes, and said output port.

9. A source as in claim 7, wherein said light emitting diodes include at least a plurality of light emitting diodes of each of three colors.

10. A source as in claim 7, wherein said light emitting diodes emit their light in a direction away from said output port.

11. A controllable light source, comprising:
   a light integrator, having an output port, and having an inner surface that reflects light;
   an LED assembly, supported within said light integrator, and including a plurality of light emitting surfaces, and at least three types of light emitting diodes, at least one light emitting diode being mounted on each of said light emitting surface, each said type of light emitting diode having a different characteristic of output light produced thereby;
   a reflecting baffle, mounted between said LED assembly and said output port, and reflecting light from said LED assembly so that said light cannot be directly projected from said LED assembly to said output port;
   a controller for said light emitting diodes, that produces pulse-width modulated control pulses, having only an on state and an off state, and transitions between said on state and said off state;
   a brightness controller, controlling an amount of said on state and an amount of said off state, to produce longer on states for higher brightness out of said output port, and shorter on states for lower brightness out of said output port.

12. A method of producing a controllable light amount, comprising:
   producing a digital control signal that has active portions and inactive portions;
   using said digital control signal to drive a digitally-controllable light source to produce output light; and
   uniformizing said output light, to obtain output light of an intensity that is based on said digitally controllable light source.

* * * * *